United States Patent
Lutgen (10) Patent No.: US 9,800,341 B2
(45) Date of Patent: Oct. 24, 2017

(54) METHOD AND APPARATUS FOR PROVIDING NETWORK INTERFACE USING OPTICAL NETWORK TERMINAL ("ONT") PLUG

(71) Applicant: Craig Lawrence Lutgen, Richardson, TX (US)

(72) Inventor: Craig Lawrence Lutgen, Richardson, TX (US)

(73) Assignee: Tellabs Operations, Inc., Naperville, IL (US)

( * ) Notice: Subject to any disclaimer, the term of this patent is extended or adjusted under 35 U.S.C. 154(b) by 224 days.

(21) Appl. No.: 14/078,361

(22) Filed: Nov. 12, 2013

(65) Prior Publication Data
US 2015/0131993 A1    May 14, 2015

(51) Int. Cl.
| | | |
|---|---|---|
| G02B 6/36 | (2006.01) | |
| G02B 6/26 | (2006.01) | |
| G02B 6/38 | (2006.01) | |
| G02B 6/00 | (2006.01) | |
| H04B 10/272 | (2013.01) | |
| G02B 6/42 | (2006.01) | |

(52) U.S. Cl.
CPC ............. *H04B 10/272* (2013.01); *G02B 6/00* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 6,490,727 B1* | 12/2002 | Nazarathy | ........... | H04J 14/0226 348/E7.071 |
| 6,533,466 B1* | 3/2003 | Smith | .................. | G02B 6/3817 385/60 |
| 2010/0166419 A1* | 7/2010 | Elmoalem | .......... | H04Q 11/0067 398/2 |
| 2012/0275784 A1* | 11/2012 | Soto | .................... | H04B 10/2503 398/38 |

(Continued)

OTHER PUBLICATIONS

Information Specification. SFF Committee. "SFP (Small Formfactor Pluggable) Transceiver". May 12, 2001.

*Primary Examiner* — Kaveh C Kianni
*Assistant Examiner* — Hung Lam
(74) *Attorney, Agent, or Firm* — James M. Wu; JW Law Group (57) ABSTRACT

A communications network, in one embodiment, includes a passive optical network ("PON") network, user equipment ("UE"), and optical network terminal ("ONT") plug to facilitate data transfer via an optical network. The PON network containing at least one fiber splitter and one optical line terminal ("OLT") is capable of transmitting optical data. The UE having a high-speed electrical ("HSE") port is able to process information based on electrical signals received from the HSE port. The ONT plug, in one embodiment, includes a modular electrical connector, a signal converter, and an optical and power hybrid ("OPH") interface. The modular electrical connector contains at least eight (8) electrical contacts with eight (8) positions and can be inserted into the HSE port. The signal converter is used to convert optical signals received from the optical interface to electrical signals.

20 Claims, 8 Drawing Sheets

(56) References Cited

U.S. PATENT DOCUMENTS

| | | | | |
|---|---|---|---|---|
| 2014/0258742 A1* | 9/2014 | Chien | ................... | H04L 12/10 |
| | | | | 713/300 |
| 2014/0330997 A1* | 11/2014 | Bamford | ................. | G06F 5/065 |
| | | | | 710/110 |
| 2015/0121139 A1* | 4/2015 | Kochar | ................. | G06F 11/261 |
| | | | | 714/29 |

* cited by examiner

METHOD AND APPARATUS FOR PROVIDING NETWORK INTERFACE USING OPTICAL NETWORK TERMINAL ("ONT") PLUG

FIELD

The exemplary embodiment(s) of the present invention relates to telecommunications network. More specifically, the exemplary embodiment(s) of the present invention relates to optical networking using a high-speed portable interface plug.

BACKGROUND

With increasing demand for more information to be supplied to homes and/or businesses, many network communication providers are upgrading, adding, and/or switching their networks to optical communications network(s). Optical communications networks typically offer high-speed voice, video, and data transmission between providers and homes as well as businesses. Conventional exemplary optical networks include fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends.

To transmit optical signals from a source to a destination over a Passive Optical Network ("PON"), the optical signals typically travel through multiple passive optical components such as fiber cables, optical splitters and attenuators that make up the optical distribution network ("ODN"). In one example, PON and/or ODN may contain similar component and they can be described fiber network between an optical line terminal ("OLT") and optical network terminals ("ONTs"). PON, in one aspect, may be considered as a type of ODN. PON has different versions with different capacities and speed. For example, a PON can be one of GPON (Gigabit PON), XGPON (10 Gigabit PON), EPON (Ethernet PON), GEPON (Gigabit Ethernet PON), and the like.

In PON networks, a centralized OLT is used to transmit signals via a passive fiber ODN to a multitude of ONTs. A benefit for using the PON is efficiency and cost effective because PON allows shared medium of ODN which can be amortized the costs across multiple ONTs. As such, the PON network is generally more efficient in resource consumption than an optical network using point-to-point individual links.

A drawback associated with a conventional ONT is that it is typically large in size and is not portable. Another drawback associated with conventional ONT is that it requires a dedicated power supply to support its power consumption.

SUMMARY

One embodiment of the present invention illustrates an exemplary optical network terminal ("ONT") plug for network interface between user equipment ("UE") and optical network. The optical network, in one embodiment, includes a passive optical network ("PON") network, one or more UEs, and one or more ONT plugs ("OPs") wherein each OP is used to facilitate network transfer between content provider(s) and end users via one or more optical networks. The PON network, containing at least one fiber splitter and one optical line terminal ("OLT"), is capable of transmitting optical data. The UE generally includes at least one high-speed electrical ("HSE") port which is able to process information based on electrical signals. The OP, in one embodiment, includes a modular electrical connector, a signal converter, and an optical and power hybrid ("OPH") interface. The modular electrical connector contains at least eight (8) electrical contacts with eight (8) positions such as RJ45 plug which can be removable inserted into an HSE socket of UE. The signal converter converts data between optical signals and electrical signals.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention describe here in the context of a method and/or apparatus for simplifying access to an optical network using a portable ONT Plug ("OP").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

One embodiment of the present invention illustrates an ONT Plug ("OP") which can be used to provide network interface between UE and content providers via an optical communications network. The communications network, in one example, is able to transmit data or information between users and content providers using various network devices, such as PON network(s), UE(s), and/or OPs. A function of OP is to facilitate communication between network device and optical network(s). The PON network, for instance, is an optical network capable of transmitting data and generally includes at least one fiber splitter and one optical line terminal ("OLT"). The UE, on the other hand, can be any types of user interface machine, such as laptop computer, portable device, smart phone, router, or desktop computer.

UEs are generally able to process information or data represented by electrical signals and able to receive as well as transmit data via various installed or onboard high-speed electrical ("HSE") connections, such as RJ45 port(s) and/or USB ports. To handle voluminous information across optical network, the optical signals need to be converted before they can be processed by an UE. As such, the OP can be used to convert between optical information and electrical information whereby it allows an UE to access optical network(s) seamlessly. The OP, in one embodiment, includes a modular electrical connector (or HSE connector), a signal converter, and an optical and power hybrid ("OPH") interface. The modular electrical connector ("MEC") can any types of high speed connectors, such as six electrical contacts with six positions ("6C6P") connector, RJ45 connector, RJ50 connector, Thunderbolt™ connector, USB™ connector, et cetera. The signal converter converts between optical signals and electrical signals.

Figure 1:
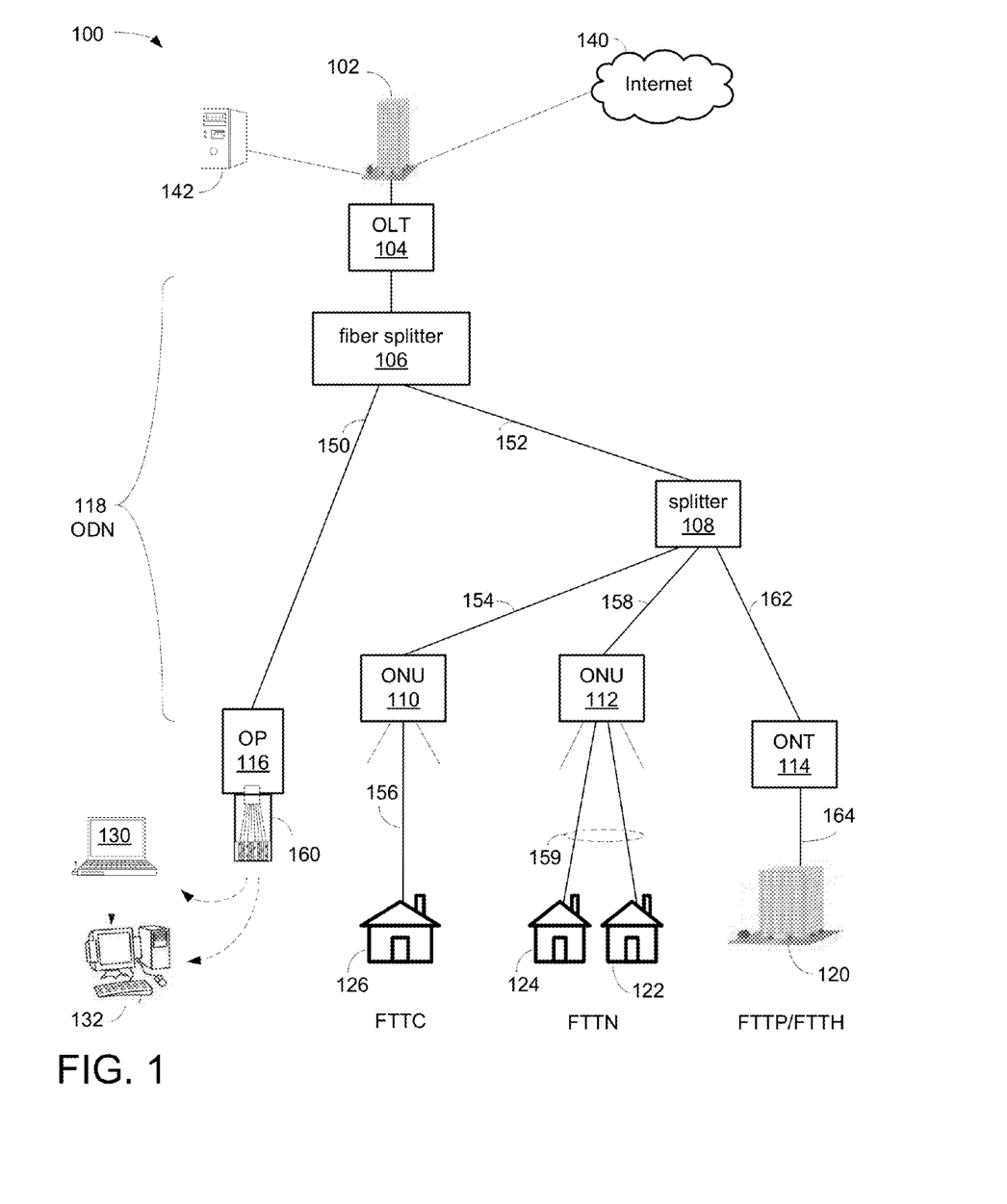
FIG. 1 is a block diagram illustrating a network layout including an ONT Plug ("OP") in accordance with one embodiment of the present invention.

FIG. 1 is a block diagram 100 illustrating a network layout including an OP 116 in accordance with one embodiment of the present invention. Diagram 100 includes a central office ("CO") 102, OLT 104, building 120, neighborhood 122-124, premise 126, UEs 130-132, and OP 116. OP 116, in one embodiment, is used to provide optical network interface between OLT 104 and UEs 130-132. UEs, in one example, include one or more of personal devices such as laptop computer 130 and desktop computer 132. Note that UEs can also include smart phones, tablets, set top boxes, servers, printers, router, and the like. It should be noted that the underlying concept of the exemplary embodiment(s) of the present invention would not change if one or more blocks (or elements or connections) were added to or removed from diagram 100.

To establish optical networking communication, an exemplary PON layout or ODN 118 may be employed. For example, FTTC is a networking layout including OLT 104 that is coupled to premise 126 (i.e., a house or home) via a network path including fiber splitters 106-108, ONU 110, and connections 152-156. FTTN illustrates a networking layout including OLT 104 that is coupled to neighborhood 122-124 via a network path including fiber splitters 106-108, ONU 112, and connections 152 and 158-159. FTTP or FTTH shows network configuration that includes OLT 104 and building 120. OLT 104 is coupled to building 120 via a network path including fiber splitters 106-108, ONT 114, and connections 152 and 162-164. In one embodiment, OP 116 is used to provide networking interface or connection between OLT 104 and UE 130 or 132 via a networking path including splitter 106 and connections 150 and 160. It should be noted that splitter 106 and 108 can be combined into one single unit.

CO 102, coupling to OLT 104, server 142, and Internet 140, is a network management system capable of maintaining and monitoring communications that it controls. For example, CO 102 provides functions for controlling, planning, allocating, deploying, coordinating, and monitoring the resources of a network, including performing functions, such as fault management, configuration management, accounting management, performance management, and security management ("FCAPS"). The fault management is able to identify, correct and store faults that occur in an optical network. The configuration management identifies, simplifies, and tracks the network configuration and the accounting management identifies and collects usage statistics for the customers or users. The performance management determines the efficiency of the current network, such as throughput, percentage utilization, error rates and response time. It should be noted that performance thresholds can trigger alarms and alerts. Security management maintains a process of controlling access to the network.

Server 142 can be a database, a service provider, and/or a cluster of network devices capable of accessing data across one or more optical networks. Internet 140 is a world-wide computer network that includes many private, public, business, government, academic, and personal networks interconnected by electronic, wireless, terrestrial, and optical networks. Note that server 142 as a content provider is capable of providing services including content to various UEs.

OLT 104, for example, supports a group of PONs 118, wherein each PON is able to support one or more ODNs. Each ODN, in one example, provides optical data transmission between one (1) OLT and a group of ONTs. Depending on the applications, a PON can usually support up to 64 ONTs. ONT 114, as shown in FIG. 1, may be physically situated at customer's premise 120, wherein premise 120 further includes various local communication devices (or equipments) such as UEs, voice device, and/or servers. A function of ONT is to convert signal format between optical signals and electrical signals. For instance, ONT 114 receives optical signals from a corresponding splitter 108 and subsequently converts the optical signals to electrical signals before the electrical signals are being transmitted to devices in building 120. Similarly, ONT 114 receives electrical signals from local devices in building 120, and then converts the electrical signals to optical signals before being transmitted to OLT 102 via splitters 106-108. In one aspect, CO 102 manages multiple OLTs.

A function of ONU 110 or 112 is to convert signal format between optical signals and electrical signals, and splits one fiber into multiple electrical connections. For instance, ONU 112 receives optical signals from a corresponding splitter 108 and subsequently converts the optical signals to electrical signals before the electrical signals are being transmitted to premise 122 or 124 or both. Similarly, ONT 112 receives electrical signals from both premises 122 and 124, and then converts the electrical signals to optical signals and combines both signal streams into one optical transmission before being transmitted to OLT 102 via splitters 106-108.

OP 116, in one embodiment, is a pluggable interface with a connector configured to interface between optical signals from fiber broadband and electrical signals from a high-speed electrical port of UE. A function of OP 116, which can be considered as a pluggable media converter, is to establish a connection between a fiber optic PON network and an end user's PC or UE via a high-speed electrical interface. An exemplary high-speed electrical interface is Ethernet connection, USB connection, Thunderbolt™ connection, Peripheral Component Interconnect Express™ ("PCIe") connection(s), or the like. Such high-speed electrical interface generally provides and/or supports sufficient bandwidth to match with optical speed and capacity. It should be noted that the connector, which is used to plug to a PC, can be a standardized interface that is capable of supporting detaching activities. OP 116 also includes a power channel able to draw power from a connected power source.

OP 116, in one embodiment, includes a modular electrical connector 160, signal converter, and optical and power hybrid ("OPH") interface. Modular electrical connector ("MEC") 160, in one example, is an eight (8) position eight (8) contact ("8P8C") connector which is also commonly known as RJ45 plug. The signal converter is configured to convert data between optical signals and electrical signals. The OPH interface is used to couple to an OPH cable which is able to provide optical signals as well as power supply. Note that MEC 160 and socket that configured to receive MEC 160 can be a standardized interface configuration.

OP 116, in one aspect, is formed or fabricated as a PON module containing a high-speed PC interface connector or plug. For instance, a 10-Gigabit-capable Passive Optical Network ("XG-PON") module contains an RJ45 plug, Thunderbolt™ or USB 3.0 plug or male connector. It should be noted that OP 116, in one example, also provides a low speed control/status path to a controller.

An advantage of using OP 116 is that it simplifies network connection between UE and optical network. Another advantage of using OP 116 is that it draws power from a connected power source using a hybrid cable whereby the power from the hybrid cable can support not only the OP's power consumption but also the connected UE. OP 116 is an apparatus with a small-form factor containing PON Terminal with an Ethernet RJ45 plug.

Figure 2A:
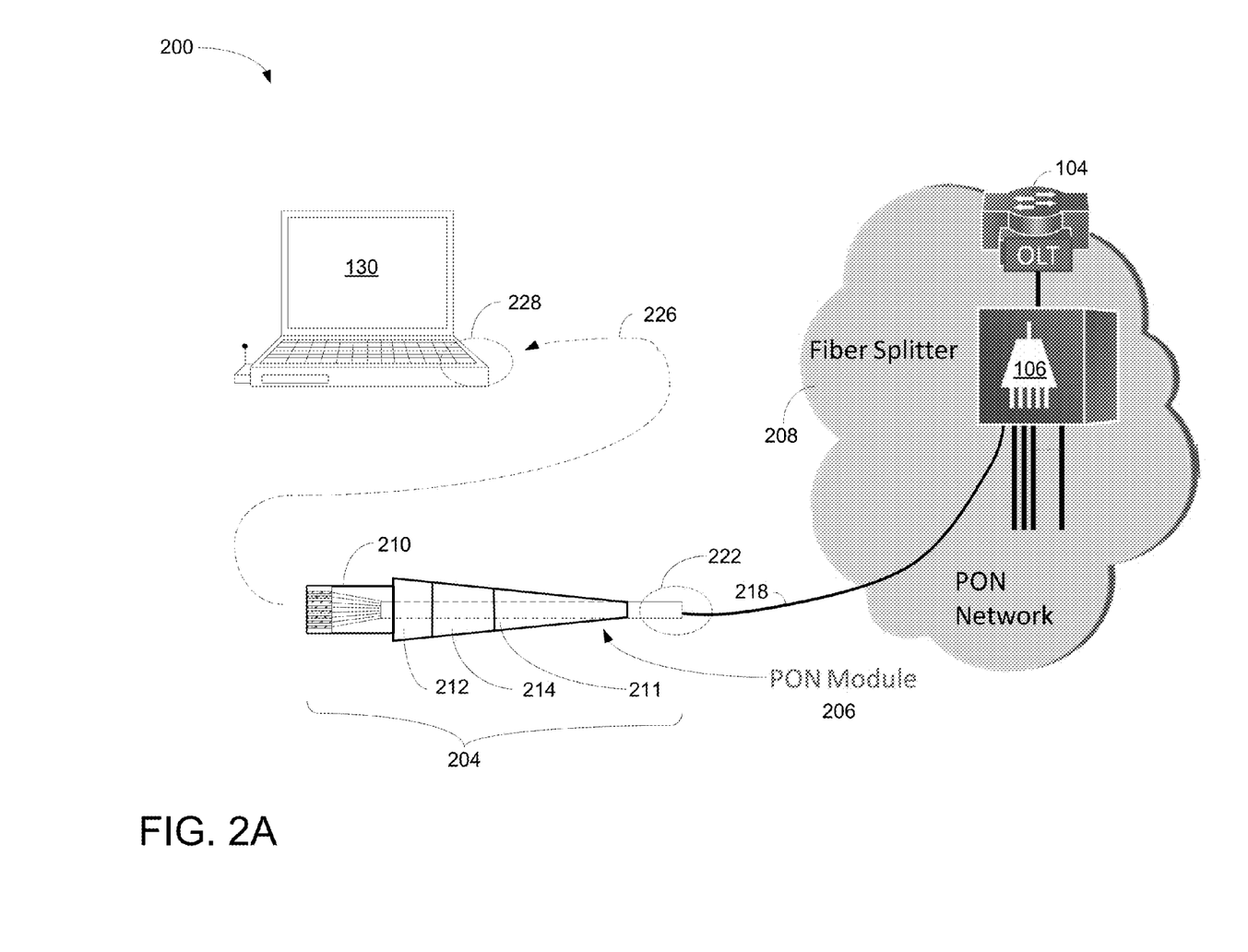
FIGS. 2A-C are block diagrams illustrating simplified optical network using OP for network interface in accordance with one embodiment of the present invention.

FIG. 2A is a block diagram 200 illustrating a simplified optical network employing an OP 204 for optical network interface in accordance with one embodiment of the present invention. Diagram 200 includes laptop 130, OP 204, and PON network 208, wherein PON network 208 includes OLT 104 and splitter 106. In one embodiment, an OPH fiber 218 is used to couple OP 204 with splitter 106. It should be noted that the underlying concept of the exemplary embodiment(s) of the present invention would not change if one or more blocks (or elements or connections) were added to or removed from diagram 200.

PON network 208, which may include additional fiber splitters and OLTs, is capable of transmitting optical data over a distance using optical fiber(s). PON network 208, in one example, is a broadband and/or multi-service access technology that allows optic transmission cables, hybrid cables, and/or fibers to reach one or more end users. It should be noted that PON network 208 can include additional network(s). For example, PON network 208 may include local area networks ("LANs"), optical LAN ("OLAN"), wireless networks, and the like. In one aspect, PON network 208 is a point-to-multipoint and fiber to multiple premises network and includes one or more ONUs, not shown in FIG. 2A, placed near the end users. Depending on the applications, up to 128 ONUs may be supported by one (1) OLT.

UE 130 equipped with at least one HSE port 228 is able to process information based on electrical signals received from the HSE port 228. UE 130, in one example, can be any types of UE(s), such as a laptop computer, desktop computer, server, workstation, tablet, smart phone, portable game console, set top box, router, switch, hub, and the like. In operation, UE 130 uses one or more standard HSE interfaces to communicate with an optical network such as PON network 208 via OP 204. The standard HSE interface as indicated by numeral 228 can be RJ45 interface, RJ50 interface, Thunderbolt™ compatible interface, USB 3.0 interface, and the like. Depending on the applications, HSE port 228 of UE 130 should have sufficient speed and bandwidth to receive and process optical data.

UE 130 can also be a network device such as a router, hub, base station, and/or switch capable of connecting to a point-to-multipoint PON network via OP 204. In operation, OP 204 is able to facilitate communication between UE 130 and PON network 208 via a hybrid cable. To support wireless devices, OP 204 distributes data or packet streams between PON network 208 and the connected devices such as UE 130.

OP 204 includes a modular electrical connector ("MEC") 210, a signal converter 214, and an OPH interface 216. MEC 210, in one example, is a connector with at least six electrical contacts with six positions ("6C6P") or RJ11 that is able to be inserted into a HSE port or RJ11 female port. Alternatively, MEC 210 is an eight (8) position eight (8) contact ("8P8C") connector configured to facilitate Ethernet communication. The 8P8C connector is also known as RJ45 plug which is configured to be inserted into an RJ45 socket installed at an UE such as laptop computer 130. MEC 210 can also be a ten (10) position ten (10) contact ("10P10C") connector, also known as RJ50 plug, configured to facilitate communication with an RJ50 socket. It should be noted that MEC 210 can also be a different type of standard high-speed electrical connector, such as USB connector or Thunderbolt™ compatible plug.

OPH interface, in one embodiment, contains two logical channels including a data channel and a power channel. While the power channel draws the power from a connected power supply such as a power outlet, the data channel handles optical signals between the signal converter 214 and hybrid or OPH cable 218. OPH cable 218, coupled to the optical interface, is configured to transmit optical signals between the OLT and OP 204 and supply power to OP 204. For example, OPH cable 218 includes a single mode ("SM") optic fiber for carrying the optical signals and 24 America Wire Gauge ("AWG") power pair for supplying power. OPH cable 218 further includes a first connector which is situated at a first end of OPH cable configured to connect to the optical interface, and a second connector which is situated at a second end of OPH cable configured to connect to both optical emitter and power source.

Signal converter 214, in one embodiment, includes an electrical interface 212 and an optical interface 211, wherein converter 214 and interfaces 211-212 are interconnected to perform a PON module 206 capable of performing various ONT functions. For example, PON module 206 includes conversion of optical signals received from optical interface 211 to electrical signals and the converted electrical signals are subsequently forward to MEC 210 via electrical interface 212. When MEC 210 is coupled to HSE port 228 of UE 130 as indicated by dotted arrow 226, the electrical signals are forwarded to UE 130 via MEC 210.

In one aspect, interfaces 211-212 and signal converter 214 forms a body of OP or PON module 206 so that it can be considered as a portable PON plug. In one embodiment, OP 204 is considered as GPON plug able to perform various GPON functions. For example, a function of GPON is to negotiate with OLT 104 to allocate a timeslot within a point-to-multipoint fiber for optical data transmission.

Electrical interface 212, in one example, is able to reformat or format electrical signals received from signal converter 214 according to RJ45 protocol if MEC 210 is an RJ45 plug. RJ45 210 of OP 204, in one example, forwards the electrical signals to UE 130 via RJ45 port 228 whereby UE 130 can properly process the electrical signals according to RJ45 protocol. To upload data, upon receipt of data from UE 130 via RJ45 plug 210, electrical interface 212 decodes electrical data according to RJ45 protocol and forwards electrical signals to signal converter 214 for optical signal conversion.

OPH interface 211, in one embodiment, is able to format optical signals received from signal converter 214 according to a predefined or identified optical protocol, and subsequently transmits optical signals to the destination(s) via an optical network. OPH interface 211 also includes a hybrid component 222 used to couple to OPH cable 218. Hybrid component 222 is capable of handling both optical signals and power from OPH cable 218. Note that the power received from OPH cable 218 can be used to power OP 204. In addition, the power received from OPH cable 218 can also be used to supply power to UE 130.

PON module 206 is structured in a small-form-factor ("SFF") that at least a portion of signal converter 214 is integrated into MEC 210. PON module 206, in one embodiment, includes flexible electronics mounted on a flexible printed circuit board ("PCB") so that at least a portion of PON module 206 is an integral part of MEC 210. In an alternative embodiment, at portion of PON module or signal converter 214 and a portion of optical interface 211 are integrated into OPH cable 218. It should be noted that OP 204 and OPH cable 218 can be integrated into one single pluggable apparatus.

OP 204 including MEC 210 and PON module 206 is a small-form factor ("SFF") solution for a GPON optical network terminal which fits inline in a "plug" end of a cable so that it provides an integrated 1000 BaseT Ethernet RJ45 plug. An advantage of using OP 204 is that it allows an end user to access an optical network(s) with minimal effort and resources.

Figure 2B:
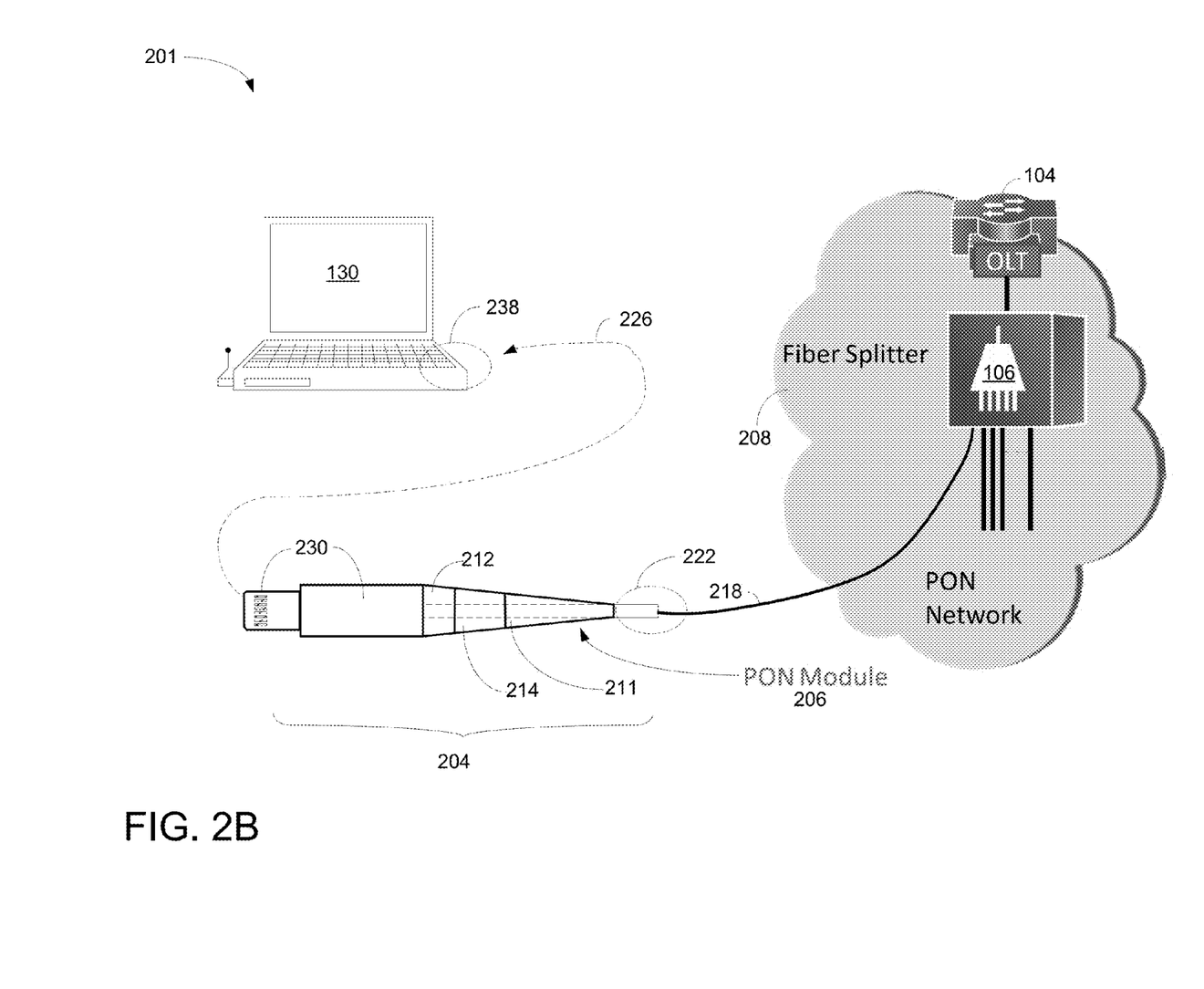

FIG. 2B is a block diagram 201 illustrating a simplified optical network employing OP 204 for network interface in accordance with one embodiment of the present invention. Diagram 201 includes laptop 130, OP 204, and PON network 208, wherein PON network 208 includes OLT 104 and splitter 106. Diagram 201 is similar to diagram 200 shown in FIG. 2A except that the configuration or specification of MEC 230 is different from MEC 210. In one embodiment, MEC 230 is a HSE plug according to Thunderbolt™ protocol and coupling specification. It should be noted that the underlying concept of the exemplary embodiment(s) of the present invention would not change if one or more blocks (or elements or connections) were added to or removed from diagram 201.

MEC 230, in one embodiment, is a Thunderbolt™ compatible plug or connector with approximately 20 pins. Thunderbolt™ technology or protocol essentially merges PCI Express (PCIe) with DisplayPort (DP) and transforms PCIe and DP into a serial data stream. MEC 230 with Thunderbolt™ connector can support multiple peripheral connections with different topologies including power supply.

In one embodiment, MEC 230 and PON module 206 are integrated into an integral structure of OP 204. Depending on the applications, OPH cable 218 can also be integrated into OP 204. To make OP 204 small and flexible, PON module 206 is divided into several sections wherein some sections are integrated into MEC 230 while some sections are integrated into OPH cable 218. For example, electrical interface 212 may be separated from converter 214 as a first section which can be integrated into MEC 230. Converter 214 and optical interface 211 may be integrated into OPH cable 218 if converter 214 and optical interface 211 are fabricated by flexible electronics. Depending on the applicable technologies, one or more sections of PON module 206 can be made flexible whereby they can be easily integrated into the hybrid cable or OPH cable 218.

Flexible circuitry, also known as flexible electronics and/or flex circuits, is a semiconductor technology which employs flexible plastic or polyimide substrates and polyester conductive film. Due to the availability and capacity of the flexible circuitry, compartmentalizing and/or separating PON module 206 into smaller components can be effective. For example, while converter may involve complicated circuitry design and difficult to implement converter in flexible electronics, optical interface 211, however, may easily be fabricated in flex circuits whereby it can become a part of hybrid cable such as OPH cable 218. It should be noted that PON module 206, which is able to perform most of the PON functions, includes digital processing controller, memory storage, software, buses, and the like to handle and deliver PON functions.

Figure 2C:
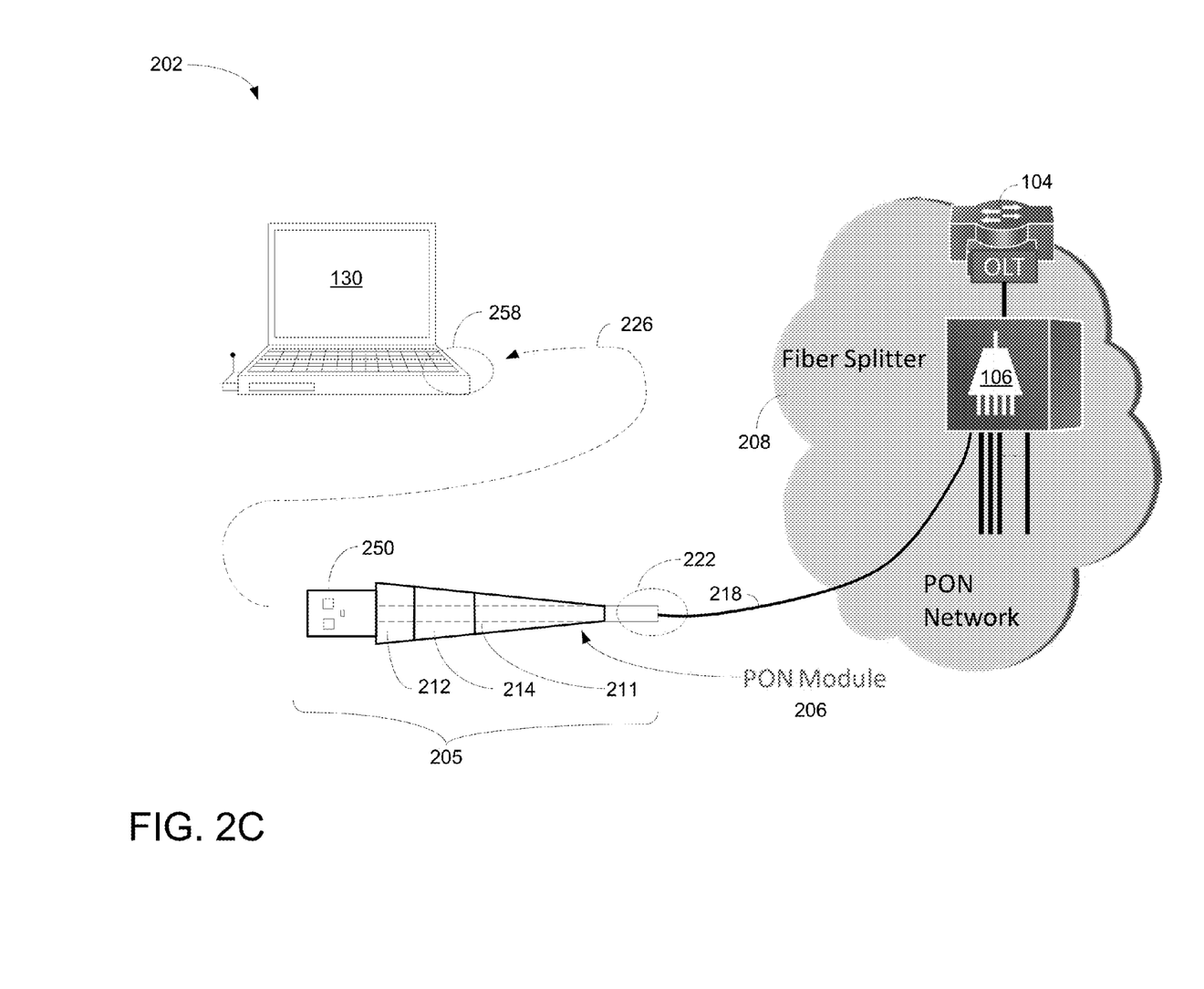

FIG. 2C is a block diagram 202 illustrating a simplified optical network employing an OP 205 for network interface in accordance with one embodiment of the present invention. Diagram 202 includes laptop 130, OP 205, and PON network 208, wherein PON network 208 includes OLT 104 and splitter 106. Diagram 202 is similar to diagram 200 shown in FIG. 2A except that the configuration or specification of MEC 250 is different from MEC 210. In one embodiment, MEC 250 is a HSE plug according to USB 3.0™ USB 5.0™ and coupling specification. It should be noted that the underlying concept of the exemplary embodiment(s) of the present invention would not change if one or more blocks (or elements or connections) were added to or removed from diagram 202.

MEC 230, in one embodiment, is a USB 3.0™ compatible plug or connector having approximately 4 to 10 pins depending on the applications. USB 3.0™ a standard for computer connectivity with an enhanced speed. For example, a range of speed for USB 3.0™ can be anywhere from 2 to 10 Gigabits per second ("Gbit/s").

In one aspect, OP 205 is configured to include a security component which is coupled to electrical interface 212 wherein the security component is used to prevent unauthorized access to the optical network such as PON network 208 via OP 205. The security component, not shown in FIG. 2C, monitors traffic passing through PON module 206 and is able to stop or halt network access if unauthorized access is detected. The unauthorized access includes hacking activities, computer virus, malware, and the like. The security component block, in one aspect, includes a biometric fingerprints identifier which permits registered user(s) to access the network if the user's fingerprints matches with stored fingerprints in OP 205. It should be noted that various other types of authentication methods may be used to authenticate user's identity.

Figure 3A:
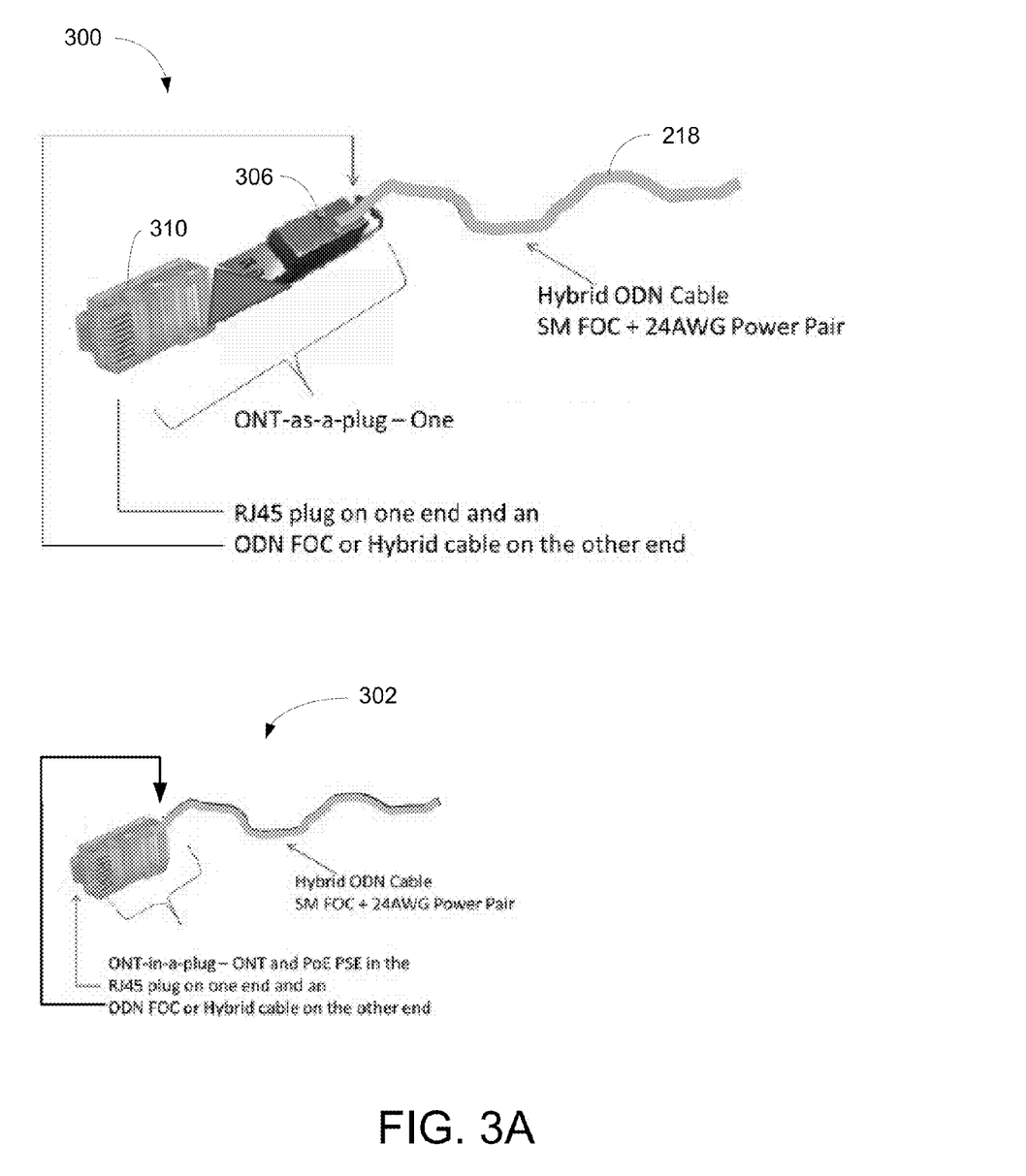
FIGS. 3A-B illustrates diagrams showing exemplary OP structures capable of providing network interface between PON and UEs in accordance with one embodiment of the present invention.

FIG. 3A illustrates diagrams showing exemplary OP structures capable of providing network interface between PON and UEs in accordance with one embodiment of the present invention. OP 300 includes MEC 310, PON module 306, and OPH cable 318 wherein MEC 310 is an RJ45 plug. MEC 310, in one embodiment, is integrated or structured together with PON module 306 as a single piece apparatus with one end coupled to an HSE socket and another end coupled to an optical network. It should be noted that the underlying concept of the exemplary embodiment(s) of the present invention would not change if one or more blocks (or elements or connections) were added to or removed from OP 300.

OP 300, in one embodiment, is a small form-factor pluggable ("SFP") concept that rather than plugging into an SFP cage, OP 300 is configured to plug directly into an Ethernet RJ45 socket. In addition, OP 300 is configured to be an inline integral part of a hybrid cable assembly whereby PON module 306 is structured with a dimension and shape similar to a hybrid cable. For example, a small cable sized PON module is integrated into a single plastic RJ45 plug at one side and the ODN fiber (and perhaps remote powering hybrid cable) on the other side.

Note that SFP is a small hot-pluggable transceiver used for connectivity between devices. SFP is applicable in telecommunication and data communications applications. In one example, RJ45 plug 310 is situated at one end of OP 300 and an ODN fiber optic connector ("FOC") or hybrid cable at the other end of OP 300. In one aspect, OP 300 is an ONT-as-a-plug-One which integrates an ONT with a power over Ethernet ("PoE") supply ("PSE"). In one example, hybrid ODN cable 218 is a single mode ("SM") FOC and 24 AWG power pair.

PSE is powered by a remotely powered hybrid cable. OP 300, as ONT-as-a-plug, is able to connect directly to a device or UE, such as a smart phone, video camera, security system, etc for providing power as well as data connectivity. In essence, the hybrid cable (for power and ODN) connected with OP 300 should be configured to fit to similar or same connection as a PoE used in active Ethernet links.

Other variations might include an in-line dongle with a CAT6 whip of several inches to several feet. It should be noted that OP 300 is not limited to GPON. EPON, XGPON, GEPON. Active Ethernet ("AE") could also use OP 300 to provide data and power with miniaturized plug form factor.

OP 302 illustrates a desirable and/or ultimate incarnation that includes all electronics of ONT and PSE integrated inside an RJ45 plug itself. It should be noted that RJ45 plug can also be replaced with other types of high-speed electrical connection plug(s), such as Thunderbolt™, USB 3.0™, and so forth.

Figure 3B:
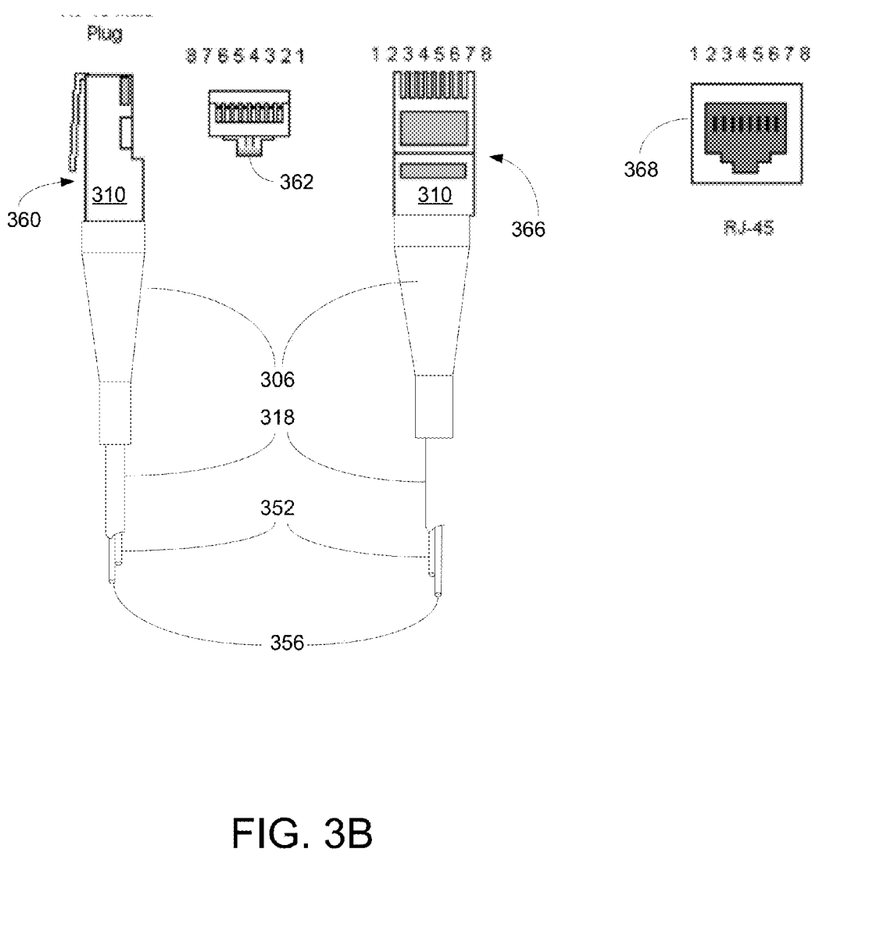

FIG. 3B shows several perspective diagrams showing OP 300 illustrated in FIG. 3A in accordance with one embodiment of the present invention. Diagram 360 shows a side view of MEC 310 and diagram 362 shows a front view of MEC 310. Diagram 366 illustrates a top view of MEC 310, and diagram 368 shows a socket for MEC 310. Note that MEC 310 is an RJ45 Plug which is coupled with PON module 306 and OPH cable 318. In one aspect, OPH cable 318 has a data channel 352 and a power channel 356 wherein data channel 352 transmits data signal while power channel 356 transports power.

Figure 4:
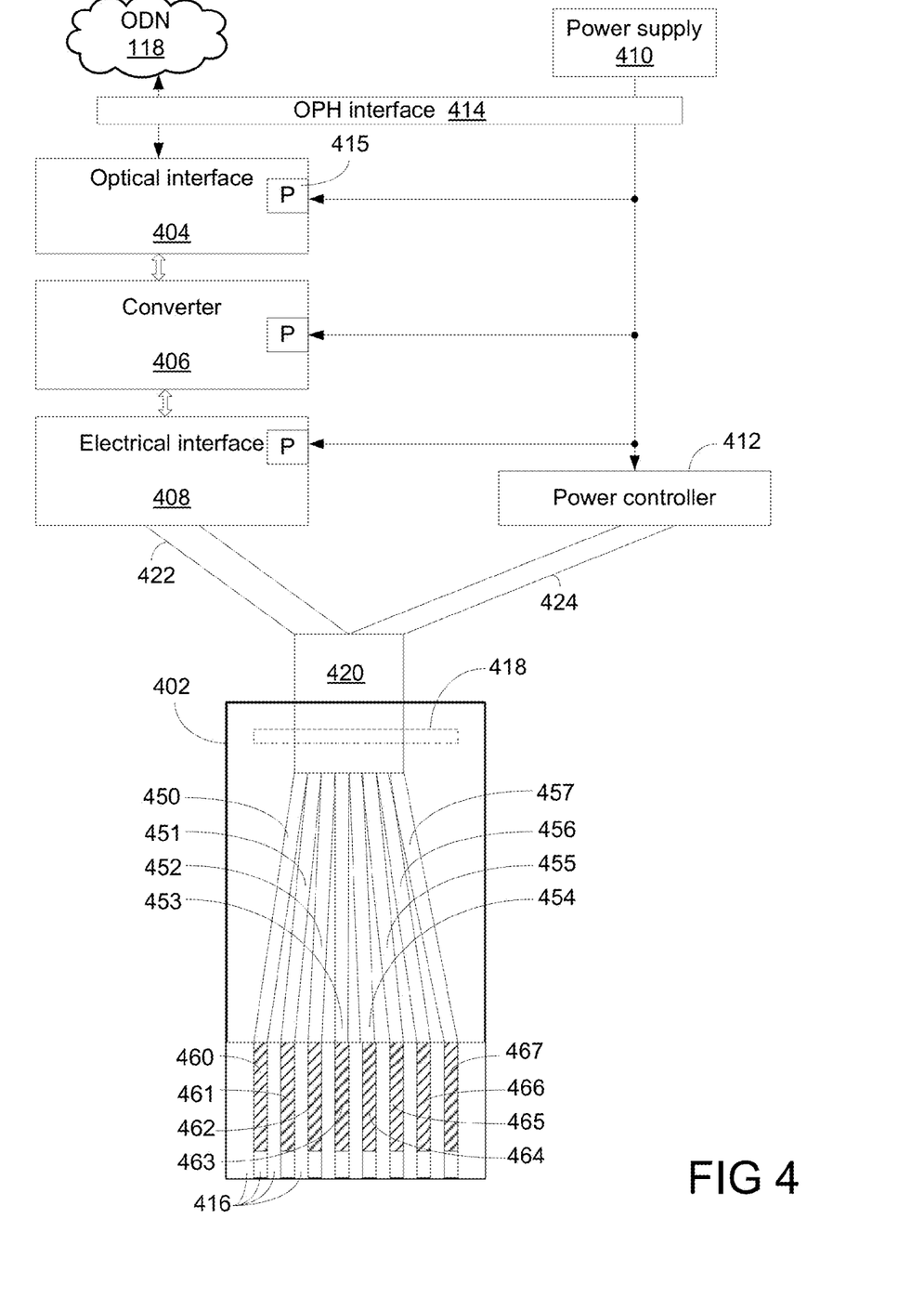
FIG. 4 is a logic diagram illustrating an exemplary OP having a modular electrical connector, converter, and OPH interface in accordance with one embodiment of the present invention.

FIG. 4 is a logic diagram 400 illustrating an exemplary OP having a MEC 402, converter 406, electrical interface 408, and OPH interface 414 in accordance with one embodiment of the present invention. In one embodiment, OPH interface 414 further includes optical interface 404 and power controller 412 wherein controller 412 manages power distribution such as power elements 415 to various components. In one embodiment, MEC 402 is an RJ45 plug. It should be noted that the underlying concept of the exemplary embodiment(s) of the present invention would not change if one or more blocks (or elements or connections) were added to or removed from diagram 400.

RJ45 plug 402, in one embodiment, is an electrical plug having eight (8) position 416 and eight (8) contact 460-467 ("8P8C") modular connector and configured to have a dimension in compliance with a predefined 8P8C socket installed at UE for data transfer between OP and the UE. Depending on the applications, eight contacts 460-467 are coupled to eight wires 450-457 wherein a first portion of wires 450-457 communicates with ODN 118 via connection 422 while a second portion of wires 450-457 communicates with power supply 410 via connection 424. Note that anchoring devices 418-420 are used to anchor wires 450-457 to RJ45 plug 402.

Converter or signal converter 406 is configured to provide network functions substantially similar to functions provided by a PON or GPON module(s) for data conversion. Electrical interface 408 transfers electrical signal or data stream between converter 406 and RJ45 plug 402 via connection 422. Optical interface 404 is capable of processing and transferring optical signal or data stream between ODN 118 and converter 406.

OPH interface 414 coupled to the hybrid cable manages data channel as well as power channel. Power controller 412 is used to distribute power to power element 415 and RJ45 plug via connection 424. OPH interface 414 with power controller 412 allows signal converter 406, electrical interface 404, optical interface 408, and RJ45 plug to draw electricity for power supply or source. Depending on the applications, RJ45 plug can also provide sufficient amount of electricity to power connected UE.

It should be noted that connections relating to RJ45, USB 3.0, Thunderbolt™, XGMII, SGMII, and 2-Wire serial interface are for illustration purposes. The underlying concept of the exemplary embodiment(s) of the present invention would not change if one or more of RJ45, USB 3.0, Thunderbolt™, XGMII, SGMII, and/or 2-Wire serial interface are replaced with other similar type(s) of connectors with standard protocols and formats.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 5:
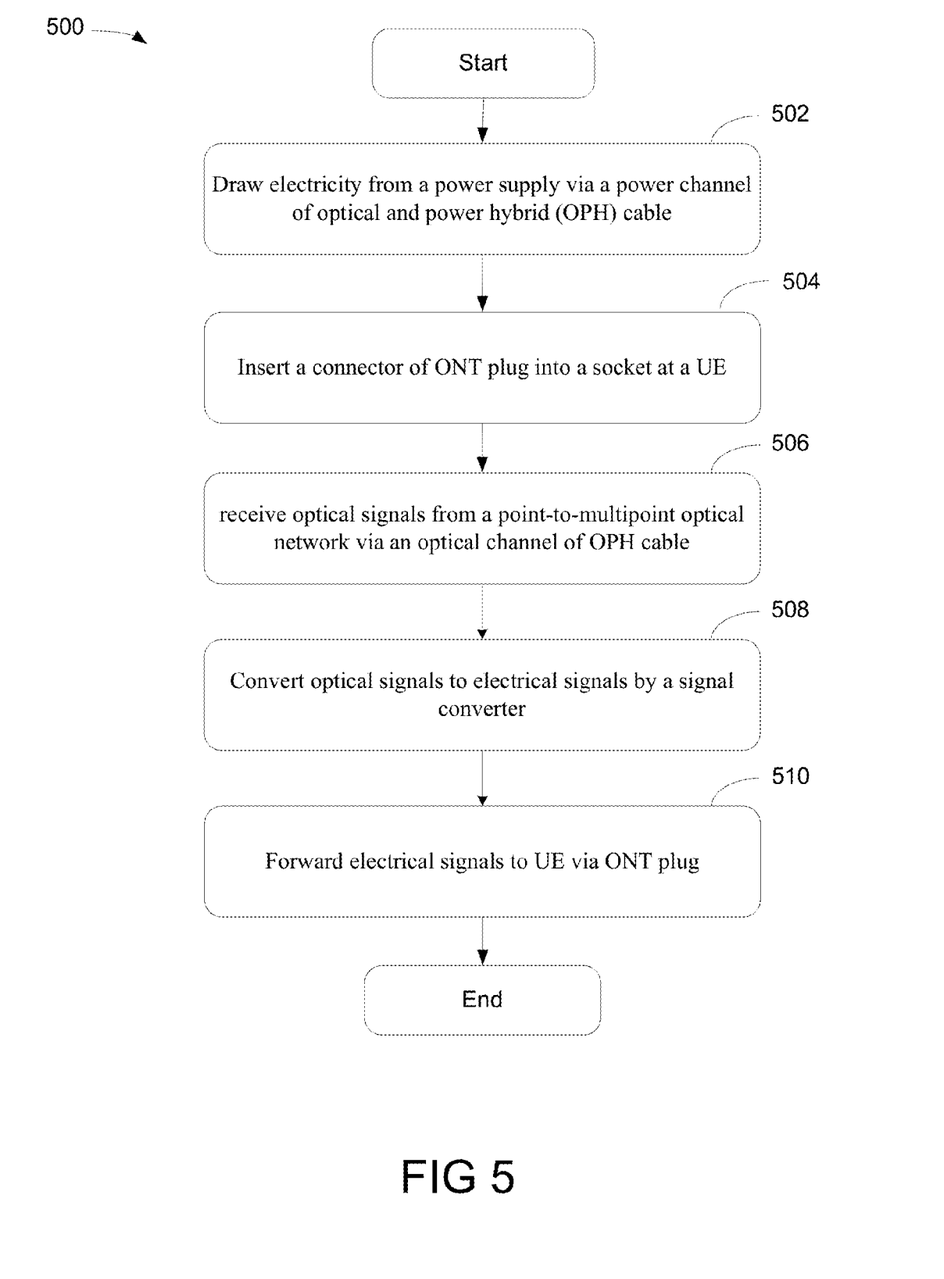
FIG. 5 is a flowchart illustrating a process for data conversion using an ONT Plug in accordance with one embodiment of the present invention.

FIG. 5 is a flowchart 500 illustrating a process of data conversion via an OP in accordance with one embodiment of the present invention. At block 502, the process of data conversion is able to draw or obtain electricity from a power supply or source using the OP or ONT plug through a power channel of OPH cable. In one aspect, the OPH cable contains a coupled single mode fiber optic connector ("SM FOC") and 24 American Wire Gauge ("AWG") power pair cable. The power source can be any types of power supply, such as power outlets, public utility power supply, battery power, and the like.

At block 504, the process permits an HSE connector (or modular electrical connector) such as RJ45 plug to be inserted into an RJ45 socket located at UE. It should be noted that other types MEC can also be used. For instance, other MEC includes Thunderbolt™, USB 3.0™, and the like.

At block 506, optical signals are received from a point-to-multipoint optical network via an optical channel of the OPH cable connected between a fiber splitter and the OP. The OP is able to perform various ONT functions. It should be noted that when an OPH cable is coupled to an OPH receptacle which should contain both optical fiber connector and power supply connector.

At block 508, the optical signals are subsequently converted to electrical signals by the signal converter of OP. Upon identifying optical data protocol associated with the optical signals, an optical to electrical converter is activated to generate electrical signals in response to optical signals. In an alternative embodiment, the OP is able to identify and handle multiple streams of optical signals with different optical protocols. In one aspect, OP is able to identify optical protocol, and recalibrates itself so that it can handle the optical signals accordingly.

At block 510, the converted data in the representation of electrical signals is forwarded to UE via the OP. Upon receiving electrical signals from UE, the electrical signals are converted to optical signals by the signal converter. After the conversion, the optical signals are forwarded to the OLT via the optical channel of OPH cable.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network configuration, comprising:
a passive optical network ("PON") network having at least one fiber splitter and one optical line terminal ("OLT"), and configured to transmit optical data;
a personal computer ("PC"), operated by an end user, configured to equip with a high-speed electrical ("HSE") port situated on the PC and able to process information based on electrical signals received from the HSE port; and
an optical network terminal ("ONT") plug having a modular electrical connector, a signal converter, and an optical and power hybrid ("OPH") interface which includes a data channel and a power channel, the modular electrical connector containing at least six electrical contacts with six positions and configured to be inserted into the HSE port of the PC, the signal converter coupled to the modular electrical connector and configured to convert optical signals received from the optical interface to electrical signals.

2. The configuration of claim 1, further comprising an OPH cable coupled to the optical interface and configured to transmit the optical signals between the OLT and the ONT plug and supply power to the ONT plug.

3. The configuration of claim 2, wherein the OPH cable includes a single mode ("SM") optic fiber for carrying the optical signals and 24 America Wire Gauge ("AWG") power pair for supplying power.

4. The configuration of claim 3, wherein the OPH cable includes a first connector which is situated at a first end of OPH cable configured to connect to the optical interface, and a second connector which is situated at a second end of OPH cable configured to connect to an optical device and power source.

5. The configuration of claim 1, wherein the modular electrical connector is an eight (8) position eight (8) contact ("8P8C") connector configured to facilitate Ethernet communication.

6. The configuration of claim 5, wherein the 8P8C connector is an RJ45 plug configured to be inserted into an RJ45 socket anchored at the UE.

7. The configuration of claim 1, wherein the modular electrical connector is a ten (10)position ten (10) contact ("10P10C") connector configured to facilitate communication via an RJ50 interface.

8. The configuration of claim 1, wherein the modular electrical connector is a universal serial bus 3.0("USB 3.0") connector configured to facilitate communication via USB 3.0 protocol.

9. The configuration of claim 1, wherein the signal converter is configured to perform various gigabit passive optical network ("GPON") functions able to negotiate with the OLT to allocate a timeslot within a point-to-multipoint fiber for optical data transmission.

10. The configuration of claim 1, wherein the signal converter is structured in a small-form-factor ("SFF") that at least a portion of the signal converter is integrated into the modular electrical connector.

11. The configuration of claim 10, wherein the signal converter includes flexible electronics mounted on a flexible printed circuit board ("PCB") so that at least a portion of the signal converter can be integrated into the modular electrical connector.

12. The configuration of claim 11, wherein at least a portion of the signal converter and a portion of the optical interface are integrated into the OPH cable.

13. The configuration of claim 11, wherein the ONT plug and the OPH cable are integrated into one single pluggable apparatus.

14. An optical network terminal ("ONT") plug, comprising:
- an electrical plug having eight (8) position eight (8) contact ("8P8C") modular connector and configured to have a dimension in compliance with a predefined 8P8C socket pluggable to port at a personal computer ("PC") operated by an end user for data transfer between the ONT plug and the PC;
- a signal converter connected to the 8P8C modular connector and configured to provide network functions substantially similar to functions provided by a gigabit passive optical network ("GPON") for data transfer; and
- an optical interface connected to the signal converter and having a data channel and a power channel, the optical interface configured to draw electricity and optical data from an optical and power hybrid ("OPH") cable.

15. The plug of claim 14, wherein the 8P8C modular connector, the signal converter, and the optical interface are integrated into a single unit; and wherein the 8P8C modular connector is an RJ45 plug.

16. The configuration of claim 14, wherein the OPH cable includes a single mode ("SM") optic fiber for carrying the optical signals and 24 America Wire Gauge ("AWG") power pair for supplying power.

17. A network system, comprising:
- a passive optical network ("PON") network having at least one fiber splitter and one optical line terminal ("OLT"), and configured to transmit optical data;
- a portable computer operated by an end user including a high-speed electrical ("HSE") port situated on the portable computer and able to process information based on electrical signals received from the HSE port; and
- an optical network terminal ("ONT") plug having a modular electrical connector, a signal converter, and an optical and power hybrid ("OPH") interface which includes a data channel and a power channel for processing optical data and power, the modular electrical connector configured to directly couple to the HSE port of the portable computer, the signal converter coupled to the modular electrical connector and configured to convert optical signals.

18. The system of claim 17, further comprising an OPH cable coupled to the optical interface and configured to transmit the optical signals between the OLT and the ONT plug and supply power to the ONT plug.

19. The system of claim 18, wherein the OPH cable includes a single mode ("SM") optic fiber for carrying the optical signals and 24 America Wire Gauge ("AWG") power pair for supplying power.

20. The system of claim 19, wherein the OPH cable includes a first connector which is situated at a first end of OPH cable configured to connect to the optical interface, and a second connector which is situated at a second end of OPH cable configured to connect to an optical device and power source.

* * * * *